US009028997B2

(12) United States Patent
Moscinski et al.

(10) Patent No.: US 9,028,997 B2
(45) Date of Patent: May 12, 2015

(54) CERAMIC COLLARS FOR ACTIVE BRAZING IN SODIUM-BASED THERMAL BATTERIES

(71) Applicant: General Electric Company, Schenectady, NY (US)

(72) Inventors: Michael Colan Moscinski, Niskayuna, NY (US); Reza Sarrafi-Nour, Niskayuna, NY (US); Badri Narayan Ramamurthi, Niskayuna, NY (US); Mohandas Nayak, Bangalore (IN); Darren Michael Stohr, Niskayuna, NY (US); Sundeep Kumar, Bangalore (IN); Mohamed Rahmane, Niskayuna, NY (US); Arunabh Basak, Bangalore (IN); Raghavendra Rao Adharapurapu, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 105 days.

(21) Appl. No.: 13/729,343

(22) Filed: Dec. 28, 2012

(65) Prior Publication Data
US 2014/0186691 A1 Jul. 3, 2014

(51) Int. Cl.
*H01M 2/08* (2006.01)
*H01M 10/39* (2006.01)

(52) U.S. Cl.
CPC ............ *H01M 2/08* (2013.01); *H01M 10/3909* (2013.01); *H01M 10/399* (2013.01); *H01M 10/39* (2013.01)

(58) Field of Classification Search
USPC .................. 429/104, 185, 507–510; 277/654; 29/623.2
See application file for complete search history.

(56) References Cited

U.S. PATENT DOCUMENTS 4,074,026 A * 2/1978 Bones ........................ 429/104
4,215,466 A * 8/1980 Bindin ....................... 29/623.2
(Continued)

FOREIGN PATENT DOCUMENTS

| JP | 06243890 A | 9/1994 |
| JP | 2003288867 A | 10/2003 |
| WO | 996659 A1 | 12/1999 |
| WO | 9965642 A1 | 12/1999 |

OTHER PUBLICATIONS

Tinsleya et al., "The Reduction of Residual Stress Generated in Metal-Ceramic Joining," Materials and Manufacturing Processes, vol. 13, Issue 4, pp. 491-504, 1998.

(Continued)

*Primary Examiner* — Gregg Cantelmo
(74) *Attorney, Agent, or Firm* — Francis T. Coppa

(57) ABSTRACT

The present application provides for ceramic collars and metal rings for active brazing in sodium-based thermal batteries. The ceramic collar may be an alpha-alumina collar configured for active brazing, and thereby sealing, to outer and inner Ni rings for use in NaMx cells. The portions of the alpha-alumina collar active brazed to the outer and inner Ni rings may be outwardly facing and include inwardly extending recesses. The portions of the outer and inner Ni rings active brazed to the outwardly facing portions of the collar may be inwardly facing. The alpha-alumina collar may include a greater coefficient of thermal expansion than each of the outer and inner Ni rings, and the alpha-alumina collar and outer and inner Ni rings may be configured such that a portion of the outer and inner Ni rings is deformed into the inwardly extending recesses of the alpha-alumina collar after active brazing thereof.

21 Claims, 11 Drawing Sheets

(56) References Cited

U.S. PATENT DOCUMENTS

| | | | |
|---|---|---|---|
| 4,564,568 A * | 1/1986 | Hasenauer et al. | 429/104 |
| 5,009,357 A | 4/1991 | Baker et al. | |
| 5,161,908 A | 11/1992 | Yoshida et al. | |
| 5,163,770 A | 11/1992 | Soma et al. | |
| 5,351,874 A | 10/1994 | Rajner et al. | |
| 7,544,275 B2 | 6/2009 | Lamaze | |
| 2003/0054255 A1 * | 3/2003 | Hidaka et al. | 429/241 |

OTHER PUBLICATIONS

Zhang et al., "Effect of Residual Stress on the Strength of an Alumina-Steel Joint by Partial Transient Liquid Phase (PTLP) Brazing," vol. 122, Issue 2-3, pp. 220-225, Mar. 28, 2002.

Galli et al., "Relief of the Residual Stresses in Ceramic-Metal Joints by a Layered Braze Structure," Advanced Engineering Materials, vol. 8, Issue 3, pp. 197-201, Mar. 2006.

* cited by examiner

CERAMIC COLLARS FOR ACTIVE BRAZING IN SODIUM-BASED THERMAL BATTERIES

BACKGROUND

The present disclosure generally relates to ceramic collars for active brazing to metal rings in sodium-based thermal batteries, and methods of active brazing ceramic collars to metal rings in sodium-based thermal batteries.

High-temperature rechargeable batteries, such as sodium-based thermal batteries like sodium metal halide or sodium sulfur cells, typically have a number of components that need to be sealed for the cell to work. Sodium metal halide (NaMx) batteries, for instance, may include cells including a sodium metal anode and a metal halide (NiCl2 for example) cathode. A beta"-alumina solid electrolyte (BASE) separator can be used to separate the anode and cathode. The solid electrolyte may allow the transport of sodium ions between anode and cathode. A secondary electrolyte (NaAlCl4) can also used in the cathode mixture. The cathode mixture typically consists of nickel and sodium chloride along with other additives. The cathode mixture is contained inside the BASE tube, which is closed on one end.

In the present typical design of NaMx cells, the open end of the beta"-alumina ceramic tube is joined to an alpha-alumina collar using a glass seal. Spinel, zirconia, yttria, or other ceramic insulators, or combinations thereof, may also be used as a collar material in NaMx cells. The alpha-alumina collar isolates electrically the anode from the cathode. In order to enable the coupling (e.g., welding) of this ceramic subassembly to the metallic current collectors anode and cathode), two metallic rings (typically Ni) are coupled or otherwise bonded or sealed (e.g., hermetically sealed) to the alpha-alumina collar prior to the sealing glass operation. The inside metal ring is typically welded to the cathode current collector and the outside metal ring is typically welded to the anode current collector (e.g., the battery case). The integrity of these two metal-ceramic joints is critical for the reliability and safety of the NaMx cell. This conventional, sealing arrangement of an alumina collar structure in these types of cells, relative to one or more metal rings, is depicted in FIGS. 1, 2A, and 2B, which are further described in detail below. FIG. 1 is a perspective sectional view of a portion of an exemplary NaMx cell, including a prior art, exemplary alpha-alumina collar, sealed to nickel (Ni) outer and inner rings. FIGS. 2A-B are perspective views of the sealed prior art alpha-alumina collar and Ni rings of the cell of FIG. 1.

The coupling of the metal (e.g., Ni) rings and ceramic (e.g., alpha-alumina) collar is typically achieved with two main process steps: (1) metallization of the alpha-alumina collar; and (2) thermal compression bonding (TCB) of both Ni rings to the metalized ceramic collar. Generally speaking, the first process step of metalizing the alpha-alumina collar provides a bond (e.g., a glass bond) between a pure Mo metallization layer and the alumina collar, and the second process step of TCB provides a diffusion bond between the Mo in the metallization layer and the Ni of the inner and outer rings.

As mentioned above, to be able to join a Ni ring via a TCB to an alpha-alumina collar in a NaMx cell, it is necessary to initially metalize the alumina. Without the metallization, it is difficult to create a metallurgical bond during the TCB process between the Ni ring and the alpha-alumina collar. Metalizing of alumina has been practiced since the late 1940's, with the Mo—Mn process being the most studied and the most widely commercialized metallization process for alpha-alumina. In the process, the paste material is applied to alumina typically via screen printing, and heated treated (e.g., about 1500 degrees C. to about 1600 degrees C.) with wet hydrogen to bond the Mo to the alumina. During the heating process glass flows from the debased alumina into the Mo layer, and the wet hydrogen may promote the wicking and wetting of the glassy phase in the alumina into the Mo layer. However, in a NaMx cell Mn is incompatible with the chemistry used in the cell and is highly susceptible to corrosion. It is therefore necessary to use a metallization process that uses only a 100% Mo paste. Unfortunately, using 100% Mo makes the metallization process more difficult and narrows the process window by significantly restricting the operating ranges of common processing variables, temperature, dew point, and glass composition. Further TCB process is a batch-process and requires large investments to produce large number of parts. As a result, the TCB process is also time consuming, not-scalable and expensive.

Once formed, however, the Mo metallization layer provides a metal surface for the bonding of the Ni rings to the alpha collar. As mentioned above, the Mo layer is a composite comprised of two interlaced phases—Mo and glass. The subsequent thermal compression bonding (TCB) step is the formation of a metallurgical bond between the Ni ring and Mo metalized layer on the alpha-alumina collar. Specifically, the bond is created by heating the Ni rings and metalized alumina collar while they are in contact and relatively high pressure is applied to the joints therebetween. To create a sufficient bond, the Ni rings and metalized alumina collar must be subjected to relatively high temperatures (e.g., at least about 950 degrees C.), for relatively long periods of time (e.g., at least about 45 minutes) and while subjected to a significant load (e.g., at least about 750 kg force). Further, each Ni ring and alumina collar subassembly must be individually arranged or processed such that the Ni rings are properly located on the alumina collar and the compressive load is applied to the joint between the Ni rings and alumina collar. Thereby, the TCB process is also time consuming and expensive.

Although the metallization and TCB process is difficult, time consuming and expensive, it is the typical process to bond Ni rings and alpha-alumina collars in NaMx cells due to the relatively high bond strength achieved thereby. In fact, the main advantage or CTQ (Critical to Customer) parameter of the metallization and TCB sub-assembly is the metal-to-ceramic bond strength achieved between the Ni rings and the alpha-alumina collar, along with hermeticity of the bond. Typically, the metal-to-ceramic bond between the Ni rings and the alpha-alumina collar are tested by a peel test which subjects the metal-ceramic bond to a tensile stress until failure while the load-to-failure variable or metric is measured. While the tensile strength of the metal-to-ceramic bonds are important (such as to sufficiently withstand internal pressures present during the operation of NaMx cell batteries), it is noted that the tensile strength of the bonds is used as an overall strength indication of bonds (i.e., ability to withstand tensile and other forces present during the operation and life of NaMx cell batteries).

The strength of the TCB bond on both the inner and outer rings is controlled by a wide range of variables inherent to the components of the TCB subassembly to ensure sufficient bond strength is achieved. The microstructure of the alpha-alumina collar and the Mo metallization, along with the TCB process heavily influence the final strength of the metal-to-ceramic bond. With upwards of forty different processing steps needed to manufacture the TCB subassembly, it is necessary to develop a quality control plan for all components of the subassembly. Again, the process to achieve the TCB subassembly (metalized alumina collar and TCB collar and Ni rings) is thereby difficult to achieve, non scalable, expensive and time consuming. As a result, to advantageously avoid the difficulties, expense and time associated with the metallization and TCB process typically associated with the manufacturing of NaMx cells, alternate joining technologies for the Ni rings and alpha-alumina collar that achieve sufficient bond strength are necessary.

One potential alternative joining technology or process for sealing or bonding the Ni rings and the alpha-alumina collar in NaMx cells is active brazing. For example, active brazing the Ni rings and the alpha-alumina collar may be capable of reducing NaMx battery costs by at least two dollars per cell as compared to current metallization and TCB technologies or processes.

Active brazing metal-ceramic joints is a procedure in which one of the components from a braze alloy reacts with the ceramic and forms an interfacial bond. Conventionally, brazing is done through metallization in combination with a braze alloy. One requirement of a braze alloy for use in high temperature rechargeable batteries, such as NaMx batteries, is high corrosion resistance towards sodium and halide. Active brazing has been known to join ceramic to metal, but there are not many commercially available active braze alloys (ABAs) suitable for use in NaMx cells. Specifically, high temperature ABAs (e.g., about 900-1200 degrees C.) and ABAs resistant to corrosion from sodium and halide, as required in NaMx cells, are in short order. Further, due to the high temperatures present during active brazing in NaMx cells and the significant mismatch of the coefficient of thermal expansions of the Ni rings and the alpha-alumina collar, the typical bond strength (e.g., tensile strength) achieved with prior art Ni rings and alpha-alumina collar designs by active brazing with suitable ABAs is commonly insufficient (i.e., sufficient bond strength is difficult to achieve by active brazing prior art Ni rings and alpha-alumina collar designs).

There continues to be a growing need in the art for high performance metal halide batteries with lower fabrication costs. Thus, Ni rings and alpha-alumina collar designs capable of being sealed or bonded via active brazing that exhibit sufficient bond strength (i.e., are capable of achieving typical NaMx batter performance) is desirable. For example, Ni rings and alpha-alumina collar designs effective in producing relatively minor residual stresses via active brazing on the alumina collar due to the thermal expansion mismatch between the ceramic collar and the metal (e.g., Ni) rings are advantageous. As another example, Ni rings and alpha-alumina collar designs effective in increasing bond strength (e.g., gaining a mechanical or structural advantage) between ceramic collar and the Ni rings at least in the tensile direction are advantageous. Such improved Ni rings and alpha-alumina collar designs for active brazing should provide for bond strengths at least comparable to bond strengths achieved with conventional metallization and TCB processes, reduce manufacturing costs compared with conventional metallization and TCB processes and/or reduce manufacturing times compared with conventional metallization and TCB processes.

BRIEF DESCRIPTION

In accordance with one aspect of the present disclosure, a sub-assembly for at least partially sealing a cell of a sodium-based thermal battery is disclosed. The sub-assembly may include an outer metal ring, an inner metal ring and a ceramic collar. The outer metal ring may define a first aperture and include a first portion and a second portion. The second portion may include a first inwardly facing sealing surface. The inner metal ring may define a second aperture that is smaller than the first aperture of the outer metal ring in at least one dimension and include a third portion and a fourth portion. The fourth portion may include a second inwardly facing sealing surface. The ceramic collar may define a third aperture and include a first outwardly facing sealing surface configured for mating with the first inwardly facing sealing surface of the outer metal ring and a second outwardly facing surface configured for mating with the second inwardly facing sealing surface of the inner metal ring. The first outwardly facing sealing surface may include a first inwardly extending recess and the second outwardly facing sealing surface may include a second inwardly extending recess. In some embodiments, the at least a portion of the first inwardly facing sealing surface of the second portion of the outer metal ring may be sealed to and deformed into the first inwardly extending recess of the first outwardly facing sealing surface of the ceramic collar by active brazing. In some embodiments, at least a portion of the second inwardly facing sealing surface of the fourth portion of the inner metal ring may be sealed to and deformed into the second inwardly extending recess of the second outwardly facing sealing surface of the ceramic collar by active brazing.

In accordance with another aspect of the present disclosure, a sodium-based thermal battery including an electrically conductive case and at least one cell with a cathode current collector assembly is disclosed. The battery may include an outer metal ring, an inner metal ring and a ceramic collar. The outer metal ring may define a first aperture and include a first portion and a second portion. The first portion may be operably electrically coupled to the case. The second portion may include a first inwardly facing sealing surface. The inner metal ring may define a second aperture that is smaller than the first aperture of the outer metal ring in at least one dimension and include a third portion and a fourth portion. The third portion may be operably electrically coupled to the cathode current collector assembly. The fourth portion may include a second inwardly facing sealing surface. The ceramic collar may define a third aperture and include a first outwardly facing sealing surface configured for mating with the first inwardly facing sealing surface of the outer metal ring and a second outwardly facing surface configured for mating with the second inwardly facing sealing surface of the inner metal ring. The first outwardly facing sealing surface may include a first inwardly extending recess and the second outwardly facing sealing surface may include a second inwardly extending recess. In some embodiments, at least a portion of the first inwardly facing sealing surface of the second portion of the outer metal ring may be sealed to and deformed into the first inwardly extending recess of the first outwardly facing sealing surface of the ceramic collar by active brazing. In some embodiments, at least a portion of the second inwardly facing sealing surface of the fourth portion of the inner metal ring may be sealed to and deformed into the second inwardly extending recess of the second outwardly facing sealing surface of the ceramic collar by active brazing.

In accordance with another aspect of the present disclosure, a method of at least partially sealing a cell of a sodium-based rechargeable thermal battery including a case and a cathode current collector assembly is disclosed. The method may include obtaining an outer metal ring that defines a first aperture and includes a first portion and a second portion. The second portion may include a first inwardly facing sealing surface. The method may include obtaining an inner metal ring that defines a second aperture that is smaller than the first aperture of the outer metal ring in at least one dimension and includes a third portion and a fourth portion. The fourth portion may include a second inwardly facing sealing surface. The method may include obtaining an electrically insulating ceramic collar that defines a third aperture and includes a first outwardly facing sealing surface configured for mating with the first inwardly facing sealing surface of the outer metal ring and a second outwardly facing surface configured for mating with the second inwardly facing sealing surface of the inner metal ring. The first outwardly facing sealing surface may include a first inwardly extending recess and the second outwardly facing sealing surface may include a second inwardly extending recess. In some embodiments, the method may include active brazing at least a portion of the first inwardly facing sealing surface of the second portion of the outer metal ring to the first outwardly facing sealing surface of the ceramic collar and thereby deforming a portion of the second portion of the outer metal ring into the first inwardly extending recess of the first outwardly facing sealing surface of the ceramic collar. In some embodiments, the method may include active brazing at least a portion of the second inwardly facing sealing surface of the fourth portion of the inner metal ring to the second outwardly facing sealing surface of the ceramic collar and thereby deforming a portion of the second portion of the inner metal ring into the second inwardly extending recess of the second outwardly facing sealing surface of the ceramic collar. In some embodiments, the method may include operably electrically coupling the outer metal ring to the case. In some embodiments, the method may include operably electrically coupling the inner metal ring to the cathode current collector assembly.

These and other objects, features and advantages of this disclosure will become apparent from the following detailed description of the various aspects of the disclosure taken in conjunction with the accompanying drawings.

DRAWINGS

FIG. 1 is a perspective sectional view of a portion of an exemplary NaMx cell including an prior art exemplary alpha-alumina collar sealed to exemplary Ni outer and inner rings;

FIGS. 2A-B are perspective views of the sealed prior art alpha-alumina collar and Ni outer and inner rings of the NaMx cell of FIG. 1;

DETAILED DESCRIPTION

Figure 1:
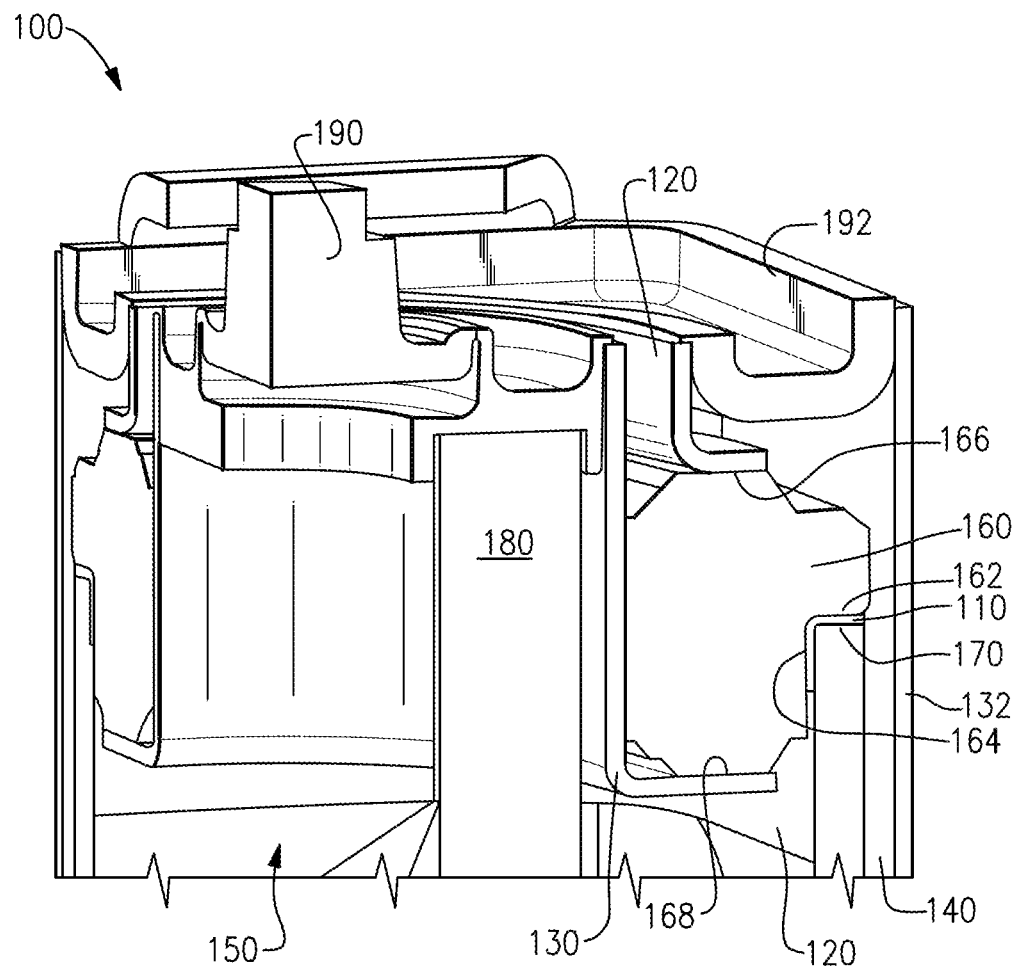

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The disclosure includes embodiments related to components and methods of sealing portions of an electrochemical cell, for example a metal halide battery such as a sodium-based thermal battery, for instance, a sodium/sulfur or a sodium metal halide battery, by utilizing active brazing. As discussed in detail below, some of the embodiments of the present invention provide for joining an alpha-alumina ceramic insulator or collar to metal rings by utilizing active brazing techniques. Other embodiments relate to alpha-alumina collars configured to be bonded to a metal rings via active brazing such that the effectuated bond strength is relatively high and sufficient for typical or expected NaMx battery performance.

In these embodiments, a braze alloy composition may be introduced between a first component (e.g., a collar) comprised of alpha-alumina and second components (e.g., rings) comprised of Ni to be joined. The first and second components may then heated to form an active braze seal (joint) between the first component and the second component. The seal may be a substantially hermetic seal.

In one particular embodiment, the same braze alloy composition can be used to join all components in the same heating cycle. By eliminating the need for metallization and TCB, these embodiments allow for fewer steps to be undertaken, decreasing the cost and time of the fabrication of NaMx cells. Though the present discussion provides examples in the context of a sodium-based thermal battery, such as a metal halide battery, these processes can be applied to many other applications which utilize ceramic collar and metallic ring sealing or joining.

The use of active brazing in embodiments of this disclosure has a number of benefits. First, it reduces the number of steps necessary involved with the prior art process of metallization of the alpha alumina collar. Secondly, it reduces the high temperature processing involved with metallization of the alpha alumina collar. Thirdly, active brazing with the improved alpha-alumna collars and Ni rings of the present disclosure results in bond strengths at least comparable (if not greater) to the bond strengths that result from the metallization and TCB processes. Further, active brazing the improved alpha-alumna collars and Ni rings of the present disclosure provides a bond that is long lasting and highly reliability. Finally, active brazing with the alpha-alumna collars and Ni rings of the present disclosure is very cost effective and a relatively quick process. In short, active brazing with the improved alpha-alumna collars and Ni rings of the present disclosure in NaMx cells decreases the number of process steps, reduces costs, decreases manufacturing time, and results in bonds that are reliable and include satisfactory performance characteristics compared to bonds resulting from prior art metallization and TCB processes. The brazing alloys used to braze the improved alpha-alumna collars and Ni rings of the present disclosure may be suitable for use in high temperature rechargeable batteries, compatible with the battery chemistry and able to be brazed below about 1250° C.

Typically, "brazing" uses a braze material (usually an alloy) having a lower liquidus temperature than the melting points of the components (i.e., their materials) to be joined (i.e., the Ni rings and alpha-alumina collar). The braze material is brought to or slightly above its melting (or liquidus) temperature while protected by a suitable atmosphere. The braze material then flows over the components (known as wetting), and is then cooled to join the components together. As used herein, "braze alloy composition" or "braze alloy", "braze material" or "brazing alloy", refers to a composition that has the ability to wet the components to be joined, and to seal them. A braze alloy for a particular application should withstand the service conditions required and melt at a lower temperature than the base materials or melt at a very specific temperature. Conventional braze alloys usually do not wet ceramic surfaces sufficiently to form a strong bond at the interface of a joint. In addition, the alloys may be prone to sodium and halide corrosion.

As used herein, the term "brazing temperature" refers to a temperature to which a brazing structure is heated to enable a braze alloy to wet the components to be joined, and to form a brazed joint or seal. The brazing temperature is often higher than or equal to the liquidus temperature of the braze alloy. In addition, the brazing temperature should be lower than the temperature at which the components to be joined may not remain chemically, compositionally, and mechanically stable. There may be several other factors that influence the brazing temperature selection, as those skilled in the art understand.

Embodiments of the present invention utilize a braze alloy composition capable of forming a joint by "active brazing" (described below). In some specific embodiments, the composition also has high resistance to sodium and halide corrosion. In some embodiments, the braze alloy composition includes nickel and an active metal element, and further comprises a) germanium, b) niobium and chromium or c) silicon and boron. Alternatively, the braze alloy composition may comprise copper, nickel and an active metal element. Each of the elements of the alloy contributes to at least one property of the overall braze composition, such as liquidus temperature, coefficient of thermal expansion, flowability or wettability of the braze alloy with a ceramic, and corrosion resistance.

"Active brazing" is a brazing approach often used to join a ceramic to a metal or a metal alloy, or a ceramic to a ceramic. Active brazing uses an active metal element that promotes wetting of a ceramic surface, enhancing the capability of providing a seal (e.g., a hermetic seal). "Sealing", as used herein, is a function performed by a structure that joins other structures together, to reduce or prevent leakage through the joint between the other structures. The seal structure may also be referred to as a "seal." An "active metal element", as used herein, refers to a reactive metal that has higher affinity to the oxygen compared to the affinity of element in ceramic and thereby reacts with the ceramic. A braze alloy composition containing an active metal element can also be referred to as an "active braze alloy." The active metal element undergoes a decomposition reaction with the ceramic, when the braze alloy is in molten state, and leads to the formation of a thin reaction layer on the interface of the ceramic and the braze alloy. The thin reaction layer allows the braze alloy to wet the ceramic surface, resulting in the formation of a ceramic-metal joint/bond, which may also be referred to as "active braze seal."

Thus, an active metal element is an essential constituent of a braze alloy for employing active brazing. A variety of suitable active metal elements may be used to form the active braze alloy. The selection of a suitable active metal element mainly depends on the chemical reaction with the ceramic (e.g., alpha-alumina of the collar) to form a uniform and continuous reaction layer, and the capability of the active metal element of forming an alloy with a base alloy (e.g. Ni—Ge alloy). An 'active' element will react with the ceramic, forming a reaction layer between the ceramic and the molten braze that will reduce the interfacial energy to such a level that wetting of the ceramic takes place. The active metal element for embodiments herein is often titanium. Other suitable examples of the active metal element include, but are not limited to, zirconium, hafnium, and vanadium. A combination of two or more active metal elements may also be used. In some specific embodiments, the braze alloy includes titanium.

The presence and the amount of the active metal may influence the thickness and the quality of the thin reactive layer, which contributes to the wettability or flowability of the braze alloy, and therefore, the bond strength of the resulting joint. The active metal element is generally present in small amounts suitable for improving the wetting of the ceramic surface, and forming the thin reaction layer, for example, less than about 10 microns. A high amount of the active metal layer may cause or accelerate halide corrosion.

The braze alloy composition may further include at least one alloying element. The alloying element may provide further adjustments in several required properties of the braze alloy, for example coefficient of thermal expansion, liquidus temperature and brazing temperature. In one embodiment, the alloying element can include, but is not limited to, cobalt, iron, chromium, niobium or a combination thereof.

Figure 2A:
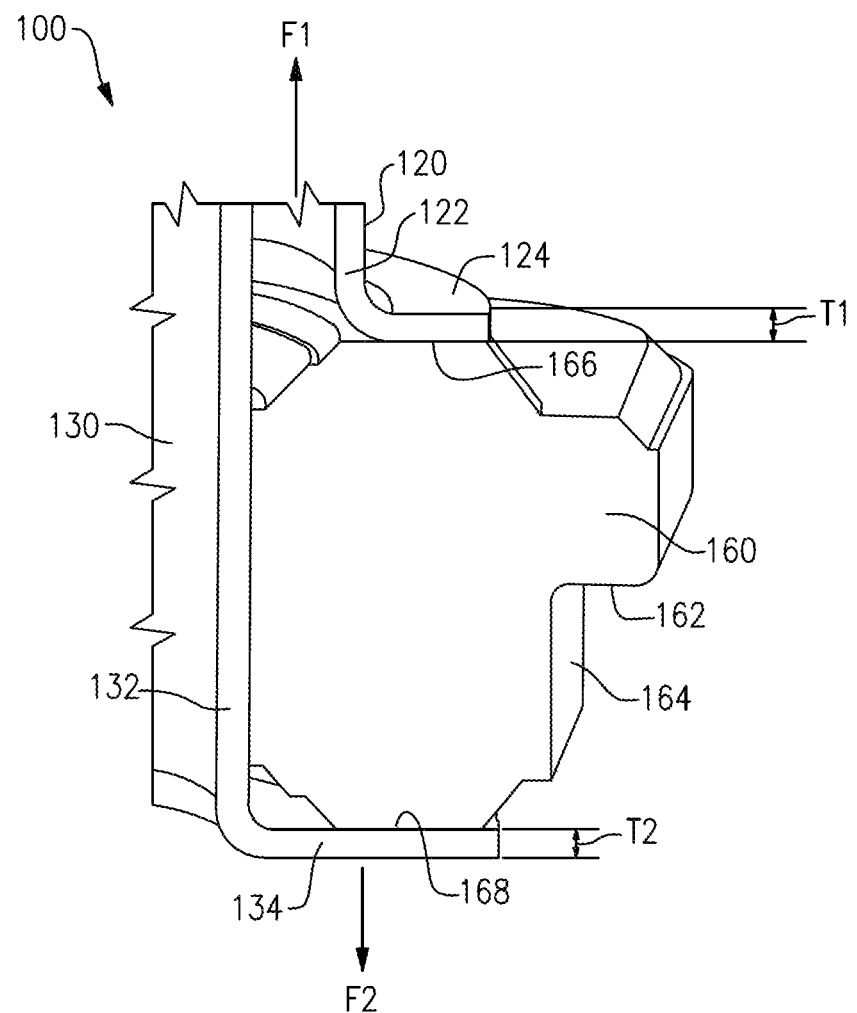
Figure 2B:
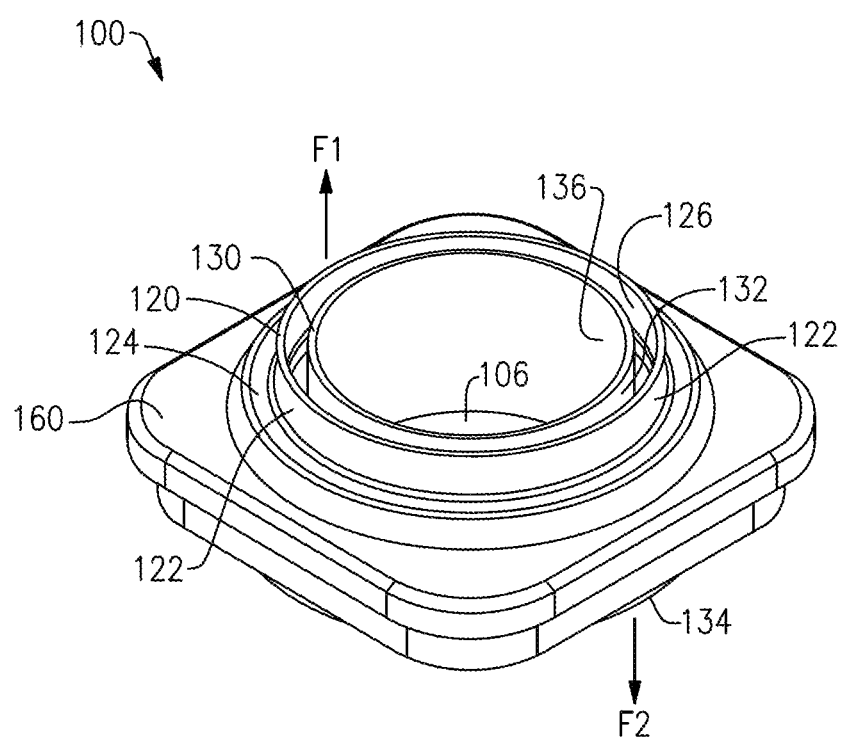

As shown in FIGS. 1-2B, an electrically insulating collar 160, which may be made of alpha-alumina, zirconia, spinel, yttria, or other ceramic insulator, or combinations thereof, may be situated at a top end 170 of a tube 122 of a NaMx battery cell. The insulating collar 160 may include or form an internal, interior or central aperture 106 that is in communication with the interior of the tube 122. A cathode current collector assembly 180 may be disposed in the cathode chamber 150, with a cap structure 190, in the top region of the cell 100, as shown in FIG. 1. The collar 160 may be fitted onto the top end 170 of the separator tube 122, and sealed thereto by a glass seal 110 in existing battery design. In one embodiment, the collar 160 includes an upper portion 162, and a lower side portion 164 that abuts against an inner wall of the tube 122, as illustrated in FIGS. 1-2B.

In order to seal (e.g., hermetically seal) the cell 100 at the top end (i.e., its upper region), and to ensure the anode and cathode are chemically and physically separate from each other and the interior of the cell is sealed, the cell 100 typically includes an outer ring 120 and an inner ring 130 which are joined, respectively, with a top portion 166 and a bottom portion 168 of the collar 160, by means of seals (e.g., a seal resulting from metallization/TCB or active brazing), as shown in FIGS. 1-2B. The outer ring 120 may include or form an internal, interior or central aperture 126 defining a first size and the inner ring 130 may form an internal, interior or central aperture 136 defining a second size that is smaller, in at least one aspect, than the first size of the aperture 126 of the outer ring 120. In some embodiments, the aperture 122 of the collar 160, the aperture 126 of the outer ring 120 and the aperture 136 of the inner ring 130 may concentric, as illustrated in FIG. 2B. In some embodiments, the aperture 106 of the collar 160, the aperture 126 of the outer ring 120 and the aperture 136 of the inner ring 130 may be substantially circular, as illustrated in FIG. 2B. In some embodiments, the inner 120 and outer 130 rings may be substantially composed of nickel.

As shown in FIG. 1, the inner ring 130 may be operably electrically coupled to the collector assembly 180 via a cap structure 190. Similarly, the outer ring 120 may be operable electrically coupled to the cell case 132 via a bridge member 192. The outer ring 120 and the inner ring 130 may be sealed shut (e.g., welded) to seal the cell 100, after joining with the collar 160 is completed. The outer ring 120 may be welded to the cell case 132; and the inner ring 130 can be welded to the current collector assembly 180, as shown in FIG. 1. To seal, bond, join or otherwise couple the inner 120 and outer 130 rings to the collar 160 the components may be temporarily held together with an assembly (e.g., a clamp) or by other techniques, if necessary, until sealing is complete.

The shapes and size of the collar and ring components discussed above with reference to FIGS. 1-2B are only illustrative for the understanding of the cell structure; and are not meant to limit the scope of the invention. The exact position, arrangement, orientation and the like of the components may vary. Moreover, each of the terms "ring" and "collar" is meant to comprise metal and ceramic parts, respectively, of any shape, configuration or arrangement, and in general, all shapes that are compatible with a particular cell design, as discussed below.

Embodiments of the disclosure include metal rings (e.g., Ni rings) and a ceramic collar (e.g., an alpha alumina collar) by using an active braze alloy composition. In such embodiments, the active braze alloy may be introduced between rings and collar to form a brazing structure. The alloy may be introduced on either or both of the mating surfaces of the components. The brazing structure may then be heated to form an active braze seal between the rings and collar. In some embodiments, the rings and collar are each joined using an active braze foil (or paste).

As shown in FIGS. 1-2B, the prior art outer Ni ring 120 may include a first upper portion 122 that is operable electrically coupled to the cell case 132 and a second lower portion 124 that is sealed, bonded or otherwise coupled to upper portion 166 of the alpha-alumina collar 160. At least the second lower portion 124 of the outer Ni ring 120 is substantially flat and defines a uniform cross section as it extends in abutment with the top portion 166 of the collar 160. Stated differently, in prior art embodiments the second portion 124 of the outer Ni ring 120 that is bonded or otherwise coupled to the collar 160, and thereby in abutment therewith, defines a substantially constant or uniform thickness T1. As such, any residual stresses on the alumina collar 160 due to thermal expansion mismatch between ceramic collar 160 and the second lower portion 124 of the outer Ni ring 120 (such as the stresses resulting from active brazing) are applied relatively equally along the portions of the upper portion 166 of the alpha-alumina collar 160 and second lower portion 124 of the outer Ni ring 120 that are sealed to one another. For example, in some embodiments the outer Ni ring 120 has a greater coefficient of thermal expansion (CTE) than the alpha-alumina collar 160. In such embodiments, if the upper portion 166 of the alpha-alumina collar 160 and second lower portion 124 of the outer Ni ring 120 are sealed to one another via an active braze, the greater change in the volume/size of the second lower portion 124 of the outer Ni ring 120 (e.g., along its length) during/after the active brazing as compared to the upper portion 66 of the alpha-alumina collar 160 will result in the second lower portion 124 "pulling" on the upper portion 166 of the alpha-alumina collar 160, potentially to an extent that the upper portion 166 is "pulled" into a convex shape. In essence, the outer Ni ring 120 will "shrink" after active brazing (i.e., during cooling) to a degree greater than the alpha-alumina collar 160 will "shrink." As such, the difference in the CTE of the outer Ni ring 120 and the alpha-alumina collar 160 will cause residual internal stresses at the seal formed by active brazing and, thereby, weaken the bond between the Ni ring 120 and the alpha-alumina collar 160. Further, because the second lower portion 124 of the outer Ni ring 120 includes a constant cross-section or thickness T1, the CTE-resulting stresses will be applied relatively equally along the bond between the upper portion 166 of the alpha-alumina collar 160 and second lower portion 124 of the outer Ni ring 120. In some embodiments, the stresses resulting from the CTE mismatch may be sufficient to produce cracks in the alpha-alumina collar 160 at, or proximate to, the first or upper surface or portion 168.

Similar to the outer Ni ring 120 shown in FIGS. 1-2B, the inner Ni ring 130 may include a first upper portion 132 that is operable electrically coupled to the collector assembly 180 and a second lower portion 134 that is sealed, bonded or otherwise coupled to the alpha-alumina collar 160. At least the second lower portion 134 of the inner Ni ring 130 is substantially flat and defines a uniform cross section as it extends in abutment with the bottom portion 68 of the collar 160. Stated differently, in prior art embodiments the second portion 134 of the inner Ni ring 130 that is bonded or otherwise coupled to the collar 160, and thereby in abutment therewith, defines a substantially constant or uniform thickness T2. As such, any residual stresses on the alumina collar 160 due to thermal expansion mismatch between ceramic collar 160 and the second lower portion 134 of the inner Ni ring 130 (such as the stresses resulting from active brazing) are applied relatively equally along the portions of the lower portion 168 of the alpha-alumina collar 160 and second lower portion 124 of the inner Ni ring 130 that are sealed to one another. For example, in some embodiments the inner Ni ring 130 has a greater coefficient of thermal expansion (CTE) than the alpha-alumina collar 160. In such embodiments, if the lower portion 68 of the alpha-alumina collar 160 and second lower portion 134 of the inner Ni ring 130 are sealed to one another via an active braze, the greater change in the volume/size of the second lower portion 134 of the inner Ni ring 130 (e.g., along its length) as compared to the lower portion 68 of the alpha-alumina collar 160 during/after the active brace will result in the second lower portion 134 "pulling" on the lower portion 68 of the alpha-alumina collar 160, potentially to an extent that the lower portion 168 is "pulled" into a convex shape. In essence, the inner Ni ring 130 will "shrink" after active brazing (i.e., during cooling) to a degree greater than the alpha-alumina collar 160 will "shrink." As such, the significant difference in the CTE of the inner Ni ring 130 and the alpha-alumina collar 160 will cause residual internal stresses at the seal formed by active brazing and, thereby, weaken the bond between the inner Ni ring 130 and the alpha-alumina collar 160. Further, because the second lower portion 134 of the inner Ni ring 130 includes a constant cross-section or thickness T2, the CTE-resulting stresses will be applied relatively equally along the bond between the lower portion 68 of the alpha-alumina collar 160 and second lower portion 134 of the inner Ni ring 130. In some embodiments, the stresses resulting from the CTE mismatch may be sufficient to produce cracks in the alpha-alumina collar 160 at, or proximate to, the second or lower portion or surface 168.

It is noted that depending upon the particular outer and inner Ni rings 120, 130 and/or collar 160 embodiments, the thickness direction (T1, T2) referenced herein may or may not be substantially aligned with the first and second tensile forces F1, F2 applied to the first upper portion 122 of the outer Ni ring 120 and the second lower portion 134 of the inner Ni ring 130, respectively, during the "peel test" described above to experimentally determine the bond strength between the Ni rings 120, 130 and the alpha-alumina collar 160, as shown in FIGS. 2A-B.

The internal stresses in the seal or bond formed by active brazing techniques between the outer and inner Ni rings 120, 130 and the alpha-alumina collar 160 caused by the CTE mismatch between the components may weaken the seal or bond to an extend that the bond strength is insufficient to withstand normal, expected or preferred operating parameters or restrictions of NaMx cells. As shown in FIGS. 3A-6B, the current disclosure may provide advantageous alpha-alumina collar and/or outer and inner Ni ring embodiments that may be effective in producing reduced or minimal internal stresses in the seal or bond formed between the outer and inner Ni rings and an alpha-alumina collar caused by the CTE mismatch between the components during/after active brazing. As also shown in FIGS. 3A-6B, the current disclosure may provide advantageous alpha-alumina collar and/or outer and inner Ni ring embodiments that may be effective in producing seals between the alpha-alumina collar and Ni rings via active brazing that include an increased bond strength as compared to prior art embodiments. In these ways, the advantageous Ni ring and alpha-alumina collar embodiments disclosed herein may be effective in being sealed via active brazing and produce a bond that includes a bond strength that is sufficient to withstand normal or expected operating parameter or restrictions of a NaMx cell (such as those simulated or experimentally tested by the tensile forces F1, F2 described above during the "peel test"). In this way, the disclosed improved advantageous alpha-alumina collar and outer and inner Ni ring embodiments may be utilized with active brazing techniques in NaMx cells to produce more cost effective high performance sodium-based thermal batteries.

Figure 3A:
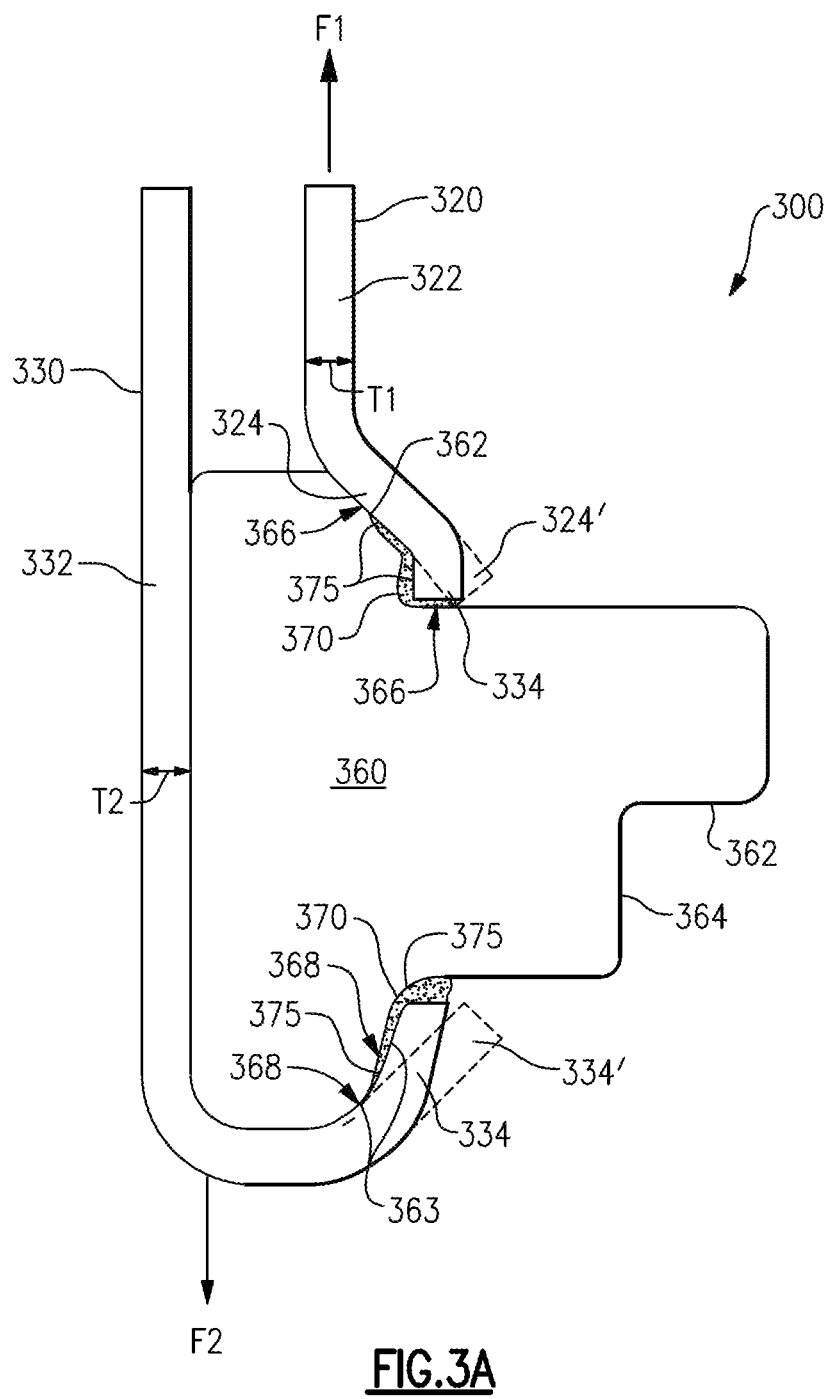
FIGS. 3A-3B are a cross-sectional view and a top view, respectively, of an exemplary first embodiment of an exemplary alpha-alumina collar sealed to exemplary Ni outer and inner rings by active brazing according to the present disclosure.
Figure 3B:
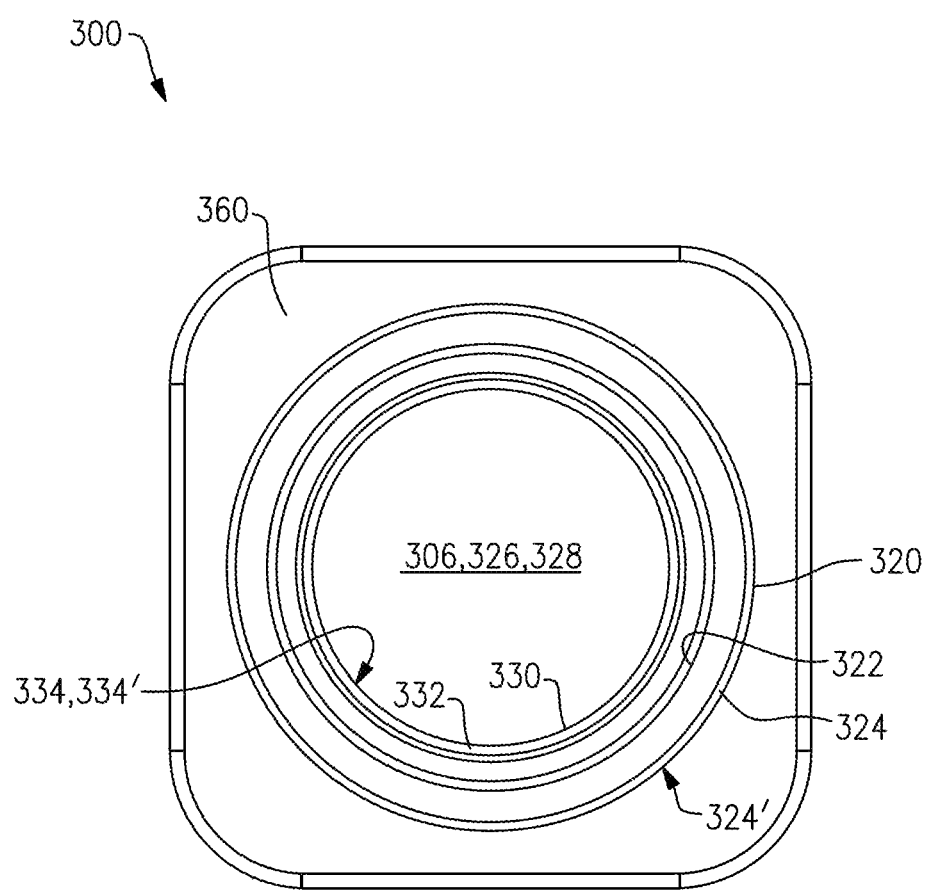

A first embodiment of an exemplary sub-assembly 300 including exemplary outer and inner Ni rings 320, 330 and an exemplary alpha-alumina collar bonded to one another by active brazing according to the present disclosure is shown in FIGS. 3A-B. As shown in FIGS. 3A-B, the exemplary outer Ni ring 320 is sealed or bonded to the exemplary alpha-alumina collar 360 via an active braze 375. Specifically, the exemplary outer Ni ring 320 includes a first upper portion 322 and a second lower portion 324 orientated at an angle with respect to the first upper portion 322. The first and second portions of the outer Ni ring 320 may be integral. In some embodiments, the outer Ni ring 320 may define a substantially constant thickness T1. In some other embodiments, the thickness of the outer Ni ring 320 may vary. For example, in some embodiments the second portion 324 may include a tapered thickness.

As shown in FIGS. 3A-B, the second portion 324 of the outer Ni ring 320 may be sealed to the alpha-alumina collar 360 via an active braze 375. As noted above, the upper portion 222 of the outer Ni ring 220 may be operably electrically coupled to the case of the battery in which it is installed, such as a NaMx battery. In such embodiments, the collar 360 may be effective in electrically insulating the outer Ni ring 320 and case to other components also coupled to the collar 360.

More specifically, the exemplary outer Ni ring 320 may be generally ring-shaped sand define an inner aperture. The second portion 324 of the outer Ni ring 320 may include an inner surface 326 that faces, at least partially, the interior or center of the aperture formed by the outer ring 320. In the exemplary embodiment, the inner surface 326 is angled with respect to the interior or center of the aperture formed by the outer ring 320 such that is faces inwardly and downwardly with respect thereto. The inner surface 326 may be substantially flat and planar linear before being sealed to the collar 360 in some embodiments, such as the illustrated exemplary embodiment shown in FIGS. 3A-B (see dashed lines). The inner surface 363 may also be substantially ring-shaped. The inner surface 326 of the second portion 324 of the outer Ni ring 320 may be sealed to the alpha-alumina collar 360 via an active braze 375.

In some embodiments, as shown in FIGS. 3A-B, the inner surface 326 of the second portion 324 of the outer Ni ring 320 may be active brazed 375 to a sealing surface 366 of the alpha-alumina collar 360. In some embodiments, the alpha-alumina collar 360 may be generally ring-shaped and define an inner aperture. An outer portion of the alpha-alumina collar 360 may include a surface as the sealing surface 366. In some embodiments the sealing surface 366 may also be ring-shaped.

In the exemplary illustrated embodiments shown in FIGS. 3A-B, the sealing surface 366 of the collar 360 for sealing with the outer ring 320 is oriented or configured such that it faces, at least partially, the interior of the aperture formed by the outer ring 320. More specifically, the sealing surface 366 is angled with respect to the interior or center of the aperture formed by the collar 360 such that is faces outwardly and upwardly with respect thereto. The inner surface 326 may be substantially flat and planar or linear, as the illustrated exemplary embodiment shown in FIGS. 3A-B. In some embodiments, the inner surface 326 of the second portion 324 of the outer Ni ring 320 and the sealing surface 366 of the collar 360 may be configured in mimicking or mirrored profiles, shapes or arrangements, at least partially, or otherwise be configured, such that the surfaces are capable of mating and sealing via the active braze 375.

As also shown in FIGS. 3A-B, the outwardly facing sealing surface 366 of the alpha-alumina collar 360 (for active brazing to the inwardly facing sealing surface 362 of the outer Ni ring 320) includes an exemplary inwardly extending recess, notch, cut-out or other inwardly extending feature or surface(s) 370. The recess 370 of the outwardly facing sealing surface 366 for mating with the outer Ni ring 320 may extend inwardly, at least partially, towards the interior of the aperture of the collar 360 with respect to the adjacent portion of the sealing surface 366, as can be seen in FIGS. 3A-B. The inwardly direction of the recess 370 of the outwardly facing sealing surface 366 may advantageously provide for a relatively strong active braze 375 bond with the outer Ni ring 320. For example, in some embodiments the outer Ni ring 320 may include a greater coefficient of thermal expansion (CTE) as compared to the alpha-alumina collar 360. In such embodiments, the outer Ni ring 320 may experience a decrease in size or volume as it cools after active brazing. Thereby, the outer Ni ring 320 may "shrink" inwardly towards the center or interior of the aperture of the outer Ni ring 320 as the outer Ni ring 320 may include a significant volume or area in such a direction.

In some such embodiments, the inwardly facing sealing surface 362 of the second portion 324 of the outer Ni ring 320 may be active brazed 375 to the outwardly facing sealing surface 366 of the collar 360. Thereby, before active brazing 375 a portion 324' of the second portion 324 of the outer Ni ring 320 may be positioned over, adjacent or proximate to the inwardly extending recess 370. In such a pre-active brazing arrangement a gap between the portion of the inwardly facing sealing surface 362 of the portion 324' of the second portion 324 adjacent the inwardly extending recess 370 may exist. However, during or after active brazing 375 the CTE of the outer Ni ring 320 (as compared to the alpha-alumina collar 360) will result in internal stresses that act to "shrink" the outer Ni ring 320, including the second portion 324 thereof, towards the center of the aperture of the outer Ni ring 320. These forces or stresses may be of a sufficient degree that they act on the portion 324' of the second portion 324 of the outer Ni ring 320 positioned adjacent the inwardly extending recess 370 to deform the portion 324' into the recess 370, as shown in FIGS. 3A-B. In such a post-active brazing arrangement or configuration, the second portion 324 of the outer Ni ring 320 (and/or at least part of the active brazing 375 material) may be deformed about the sealing surface 366 such that a portion of the sealing surface 366 of the collar 360 is positioned above (or in line with) the portion 324' of the second portion 324 (and/or braze material) that is positioned within the recess 370. In this way, the portion 324' of the second portion 324 that is positioned within the recess 370 (and/or braze material) may provide a mechanical advantage to the active braze seal 375 between the outer Ni ring 320 and the alpha-alumina collar 360 and, thereby, increase the bond strength of the active braze seal 375. For example, the portion 324' of the second portion 324 (and/or braze material) that is positioned within the recess 370 may provide resistance or add strength to the active braze seal 375 in the tensile direction of the first force F1 applied during the "peel test" described above, as shown in FIGS. 3A-B. When such tensile force F1 is applied during the "peel test", or other similar force is applied during use, the portion of the sealing surface 366 of the alpha-alumina collar 360 that the portion 324' of the second portion 324 (and/or braze material) that is positioned within the recess 370 will prevent the portion 324' of the outer ring 320 that is positioned within the recess 370 from translating in the tensile force F1 direction. Stated differently, the recess 370 provides a barrier in the tensile force F1 direction to the portion 324' of the second portion 324 of the outer ring 320. In this way, the recess 370 and the deformation of the portion 324 of the outer ring 320 due to the CTE mismatch between the Ni outer ring 320 and the alpha-alumina collar 360 advantageously increases the bond strength, at least in the tensile force F1 direction, of the active braze seal 375.

Further, the outwardly facing orientation of the sealing surface 366 of the collar 360 and the inwardly facing orientation of the sealing surface 362 of the second portion 324 of the outer Ni ring 320 further increases the bond strength between of the active braze bonds 375. As discussed above, the CTE of the outer Ni rings 320 is significantly greater than the CTE of the alpha-alumna collar 360. As such, after active braze bonding 375 the outer Ni rings 320 will tend to "shrink" at least towards the interior of the ring 320 in inwardly in a lateral or horizontal direction (a direction perpendicular to the first and second tensile forces F1, F2). As the active braze bond 375 between the second portion 324 of the outer Ni ring 320 and the first portion 366 of the alpha-alumna collar 360 is positioned at the interior side of the outer Ni ring 320 in the lateral direction, the alpha-alumna collar 360 will "shrink" and press against the alpha-alumna collar 360 as it cools after active braze bonding 375. In this way, the outer Ni ring 320 will be press-fit against the alpha-alumna collar 360 after the active braze bond 375 therebetween is formed. As a result, the internally-directed lateral forces of the outer Ni rings 320 strengthens the bond strength of the active braze bond 375 between the second portions 324 of the outer Ni rings 320 and the sealing area 366 of the alpha-alumna collar 360.

Still further, the outwardly facing aspect or orientation of the sealing surface 366 of the alpha-alumna collar 360 and the inwardly facing aspect or orientation of the sealing surface 362 of the outer Ni ring 320, and thereby the active braze bond 375 therebetween, further increases the bond strength of the active braze bond 375 as the first tensile force F1 of the "peel test" and similar loads experienced during use in a cell may not act primarily or solely in as tensile stress on the active braze bond 375. Rather, such forces will be partly applied to the active braze bond 375 as shear stress and partly applied to the active braze bonds 375 as tensile stress.

As shown in FIGS. 3A-B, the exemplary inner Ni ring 330 is bonded to the exemplary alpha-alumina collar 360 via an active braze 375. Specifically, the exemplary inner Ni ring 330 includes a first upper portion 332 and a second lower portion 334 orientated at an angle with respect to the first upper portion 332. The first and second portions of the inner Ni ring 330 may be integral. In some embodiments, the inner Ni ring 330 may define a substantially constant thickness T2. In some other embodiments, the thickness of the inner Ni ring 330 may vary. For example, in some embodiments the second portion 334 may include a tapered thickness.

As shown in FIGS. 3A-B, the second portion 334 of the inner Ni ring 330 may be sealed to the alpha-alumina collar 360 via an active braze 375. As noted above, the upper portion 332 of the inner Ni ring 330 may be operably electrically coupled to the cathode current collector assembly of the battery in which it is installed, such as a NaMx battery. In such embodiments, the collar 360 may be effective in electrically insulating the inner Ni ring 330 and cathode current collector assembly to other components also coupled to the collar 360.

More specifically, the exemplary inner Ni ring 330 may be generally ring-shaped and define an inner aperture. The second portion 334 of the inner Ni ring 330 may include an inner surface 363 that faces, at least partially, the interior or center of the aperture formed by the inner ring 330. In the exemplary embodiment, the inner surface 363 is angled with respect to the interior or center of the aperture formed by the inner ring 330 such that is faces inwardly and upwardly with respect thereto. The inner surface 363 may be substantially flat and planar or linear before being sealed to the collar 360 in some embodiments, such as the illustrated exemplary embodiment shown in FIGS. 3A-B (see dashed lines of portion 334'). The inner surface 363 may also be substantially ring-shaped. The inner surface 363 of the second portion 334 of the inner Ni ring 330 may be sealed to the alpha-alumina collar 360 via an active braze 375.

In some embodiments, as shown in FIGS. 3A-B, the inner surface 363 of the second portion 334 of the inner Ni ring 330 may be active brazed 375 to a sealing surface 368 of the alpha-alumina collar 360. In some embodiments, the alpha-alumina collar 360 may be generally ring-shaped and define an inner aperture. An outer portion of the alpha-alumina collar 360 may include a surface as the sealing surface 368 for the inner Ni ring 330. In some embodiments the sealing surface 368 for the inner Ni ring 330 may also be ring-shaped.

In the exemplary illustrated embodiments shown in FIGS. 3A-B, the sealing surface 368 of the collar 360 for sealing with the inner ring 330 is oriented or configured such that it faces, at least partially, the exterior or outside of the aperture formed by the collar 360. More specifically, the sealing surface 368 is oriented or angled with respect to the interior or center of the aperture formed by the collar 360 such that is faces outwardly and downwardly with respect thereto. Like the inner surface 363 of the inner Ni ring 330, the outwardly facing sealing surface 368 of the collar 360 may be substantially flat and planar or linear, as shown in the illustrated exemplary embodiment in FIGS. 3A-B. In some embodiments, the inner or inwardly facing surface 363 of the second portion 334 of the inner Ni ring 330 and the outer or outwardly facing sealing surface 368 of the collar 360 may be configured in mimicking or mirrored profiles, shapes or arrangements, at least partially, or otherwise be configured, such that the surfaces are capable of mating and sealing via an active braze 375.

As also shown in FIGS. 3A-B, the outwardly facing sealing surface 368 of the alpha-alumina collar 360 (for active brazing to the inwardly facing sealing surface 363 of the inner Ni ring 330) includes an exemplary inwardly extending recess, notch, cut-out or other inwardly extending feature or surface 370. The recess 370 of the outwardly facing sealing surface 368 for mating with the inner Ni ring 330 may extend inwardly, at least partially, towards the interior of the aperture of the collar 360 with respect to the adjacent portion of the sealing surface 368, as can be seen in FIGS. 3A-B. The inwardly direction of the recess 370 of the outwardly facing sealing surface 368 may advantageously provide for a relatively strong active braze 375 bond with the inner Ni ring 330. For example, in some embodiments the inner Ni ring 330 may include a greater coefficient of thermal expansion (CTE) as compared to the alpha-alumina collar 360. In such embodiments, the inner Ni ring 330 may experience a decrease in size or volume as it cools after active brazing. Thereby, the inner Ni ring 330 may "shrink" at least inwardly towards the center or interior of the aperture of the inner Ni ring 330 as the inner Ni ring 330 may include a significant volume or area in such a direction.

In some such embodiments, the inwardly facing sealing surface 363 of the second portion 334 of the inner Ni ring 330 may be active brazed 375 to the outwardly facing sealing surface 368 of the collar 360. Thereby, before active brazing 375 a portion 334' of the second portion 334 of the inner Ni ring 330 may be positioned over, adjacent or proximate to the inwardly extending recess 370, as shown by the dashed lines in FIGS. 3A-B. In such a pre-active brazing arrangement a gap between the portion of the inwardly facing sealing surface 363 of the portion 334' of the second portion 334 adjacent the inwardly extending recess 370 and the inwardly extending recess 370 may exist. However, during or after active brazing 375 the CTE of the inner Ni ring 330 (as compared to the alpha-alumina collar 360) will result in internal stresses that act to "shrink" the inner Ni ring 330, including the second portion 334 thereof, at least towards the center of the aperture of the inner Ni ring 330. These forces or stresses may be of a sufficient degree that they act on the portion 334' of the second portion 334 of the inner Ni ring 330 positioned adjacent the inwardly extending recess 370 to deform the portion 334' into the recess 370, as shown in FIGS. 3A-B. In such a post-active brazing arrangement or configuration, the second portion 334 of the inner Ni ring 330 (and/or at least part of the active brazing 375 material) may be deformed about the sealing surface 368 such that a portion of the sealing surface 368 of the collar 360 is positioned below (or in line with) the portion 334' of the second portion 334 (and/or braze material) that is positioned within the recess 370. In this way, the portion 334' of the second portion 334 that is positioned within the recess 370 (and/or braze material) may provide a mechanical advantage to the active braze seal 375 between the inner Ni ring 330 and the alpha-alumina collar 360 and, thereby, increase the bond strength of the active braze seal 375. For example, the portion 334' of the second portion 334 (and/or braze material) that is positioned within the recess 370 may provide resistance or add strength to the active braze seal 375 in the tensile direction of the second force F2 applied during the "peel test" described above, as shown in FIGS. 3A-B. When such tensile force F2 is applied during the "peel test", or a similar force is applied during use, the portion of the sealing surface 368 of the alpha-alumina collar 360 that the portion 334' of the second portion 334 (and/or braze material) that is positioned within the recess 370 is deformed about will prevent the portion 334' of the inner ring 330 that is positioned within the recess 370 from translating in the tensile force F2 direction. Stated differently, the recess 370 provides a barrier in the tensile force F2 direction to the portion 334' of the second portion 334 of the inner ring 330 that is positioned in the recess 370. In this way, the recess 370 and the deformation of the second portion 334 of the inner ring 330 due to the CTE mismatch between the Ni inner ring 330 and the alpha-alumina collar 360 advantageously increases the bond strength, at least in the tensile force F2 direction, of the active braze seal 375.

Further, the outwardly facing orientation of the sealing surface 368 of the collar 360 and the inwardly facing orientation of the sealing surface 363 of the second portion 334 of the inner Ni ring 330 further increases the bond strength between of the active braze bonds 375. As discussed above, the CTE of the inner Ni ring 330 is significantly greater than the CTE of the alpha-alumna collar 360. As such, after active braze bonding 375 the inner Ni ring 330 will tend to "shrink" towards the at least interior of the inner ring 330 inwardly in a lateral or horizontal direction (a direction perpendicular to the first and second tensile forces F1, F2). As the active braze bond 375 between the second portion 334 of the inner Ni ring 330 and the first portion 368 of the alpha-alumna collar 360 is positioned at the interior side of the inner Ni ring 330 in the lateral direction, the alpha-alumna collar 360 will "shrink" and press against the alpha-alumna collar 360 as it cools after active braze bonding 375. In this way, the inner Ni ring 330 will be press-fit against the alpha-alumna collar 360 after the active braze bond 375 therebetween is formed. As a result, the internally-directed lateral forces of the inner Ni ring 330 strengthens the bond strength of the active braze bond 375 between the second portion 334 of the inner Ni ring 330 and the second sealing surface or area 368 of the alpha-alumna collar 360.

Still further, the outwardly facing aspect or orientation of the second sealing surface 368 of the alpha-alumna collar 360 and the inwardly facing aspect or orientation of the sealing surface 363 of the inner Ni ring 330, and thereby the active braze bond 375 therebetween, further increases the bond strength of the active braze bond 375 as the second tensile force F2 of the "peel test" and similar loads experienced during use in a cell may not act primarily or solely in a tensile stress on the active braze bond 375. Rather, such forces will be partly applied to the active braze bond 375 as shear stress and partly applied to the active braze bonds 375 as tensile stress.

Third and fourth embodiments of exemplary sub-assemblies 400 and 500 including exemplary Ni rings and an exemplary alpha-alumina collars bonded to one another by active brazing according to the present disclosure are shown in FIGS. 4A-B and 5A-B, respectively. The exemplary sub-assemblies 400 and 500 are similar to the exemplary sub-assemblies 100 and 300 described above and therefore like reference numerals preceded by the numerals "4" and "5", respectively, as opposed to "1" or "3" are used to indicate like elements. The description above with respect to the other exemplary Ni rings and alpha-alumna collars, and subassemblies thereof, including description regarding alternative embodiments (i.e., modifications, variations or the like), equally applies to sub-assemblies 400 and 500 (and any alternative embodiments thereof). As shown in FIGS. 4A-B and 5A-B, inter alia, the exemplary sub-assemblies 400 and 500 differ from the exemplary sub-assembly 300 of FIGS. 3A-B in the orientation or arrangement of the second portions or sealing surfaces of the outer and inner Ni rings and the first and second portions or sealing surfaces of the alpha-alumna collar that are bonded or sealed therewith via active brazes, respectively.

Figure 4A:
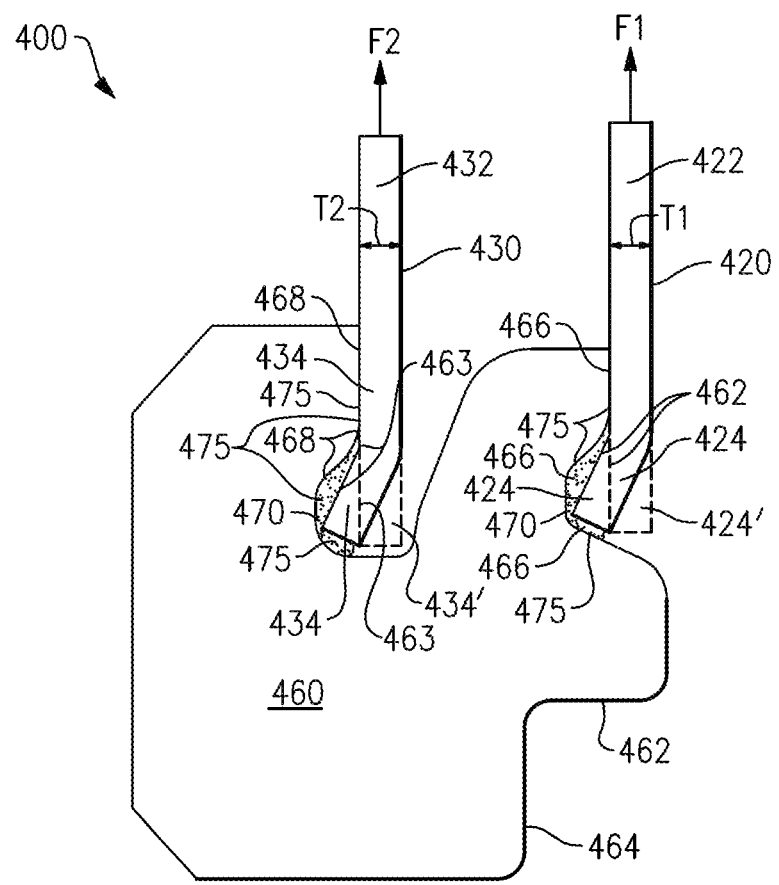
FIGS. 4A-4B are a cross-sectional view and a top view, respectively, of an exemplary second embodiment of an exemplary alpha-alumina collar sealed to exemplary Ni outer and inner rings by active brazing according to the present disclosure.
Figure 4B:
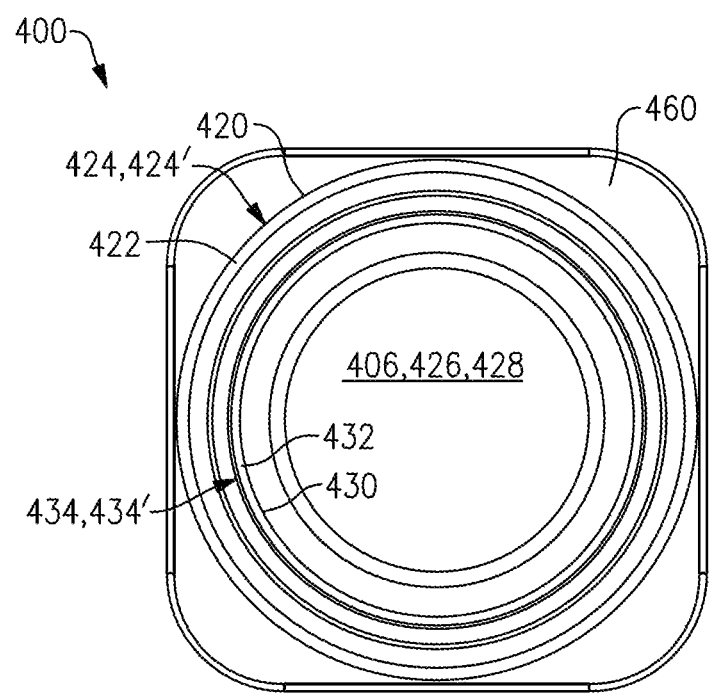

As shown in FIGS. 4A-B, the second portions 424, 434 of the outer and inner Ni rings 420, 430 and the first and second portions 466, 468 of the alpha-alumna collar 460 and the active braze bonds or seals 475 therebetween of the exemplary sub-assembly 400 are oriented substantially vertically (i.e., extend parallel to the first and second tensile forces F1, F2 of the "peel test"). As such, the active braze bonds 475 are subjected primarily or substantially to shear stress by such tensile forces F1, F2 and tensile stresses to the active braze bonds 475 are significantly eliminated. Thereby, the active braze bonds 475 may include relatively strong bond strengths. Further, as the outer and inner Ni rings 420, 430 "shrink" towards the interior of the rings 420, 430 after active brazing more than the alpha-alumna collar 460 "shrinks" in the same directions (due to the CTE mismatch), the outer and inner Ni rings 420, 430 and the first and second portions 466, 468 of the alpha-alumna collar 460, respectively, are press fit. As the second portions 424, 434 of the outer and inner Ni rings 420, 430 and the first and second portions 466, 468 of the alpha-alumna collar 460 are oriented substantially vertically, the forces resulting from the press-fit arrangement are directed substantially entirely in the lateral direction—thereby further strengthen the active braze bonds 475. Still further, the portions 424', 434' of the second portions 424, 434 of the outer and inner Ni rings 420, 430 that are proximate to the recesses 470 of the first and second sealing surfaces 466, 468 are deformed into, and are sealed therewith, via the active brazes 475 (to the CTE mismatch).

Figure 5A:
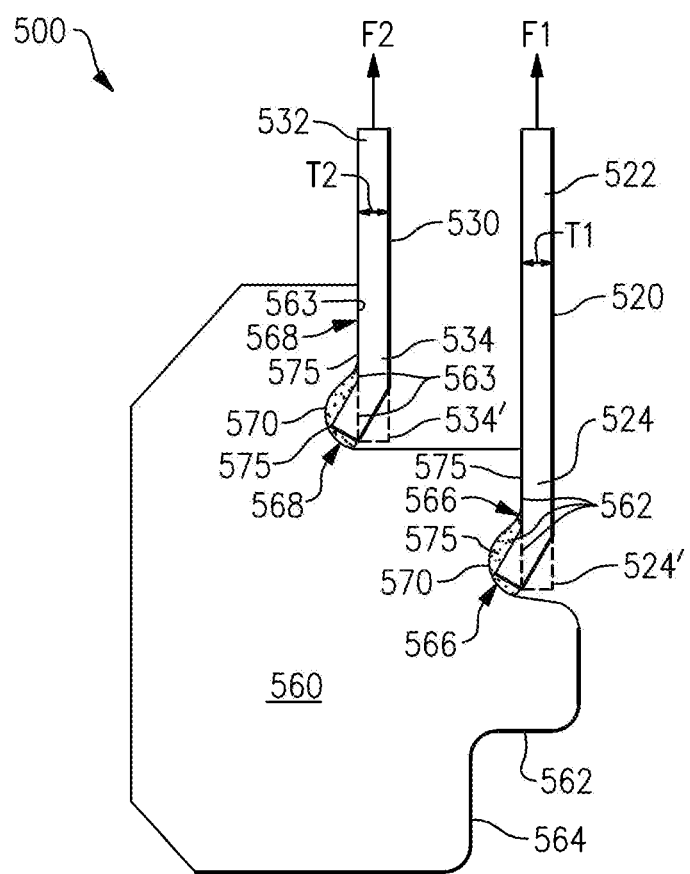
FIGS. 5A-5B are a cross-sectional view and a top view, respectively, of an exemplary third embodiment of an exemplary alpha-alumina collar sealed to exemplary Ni outer and inner rings by active brazing according to the present disclosure.
Figure 5B:
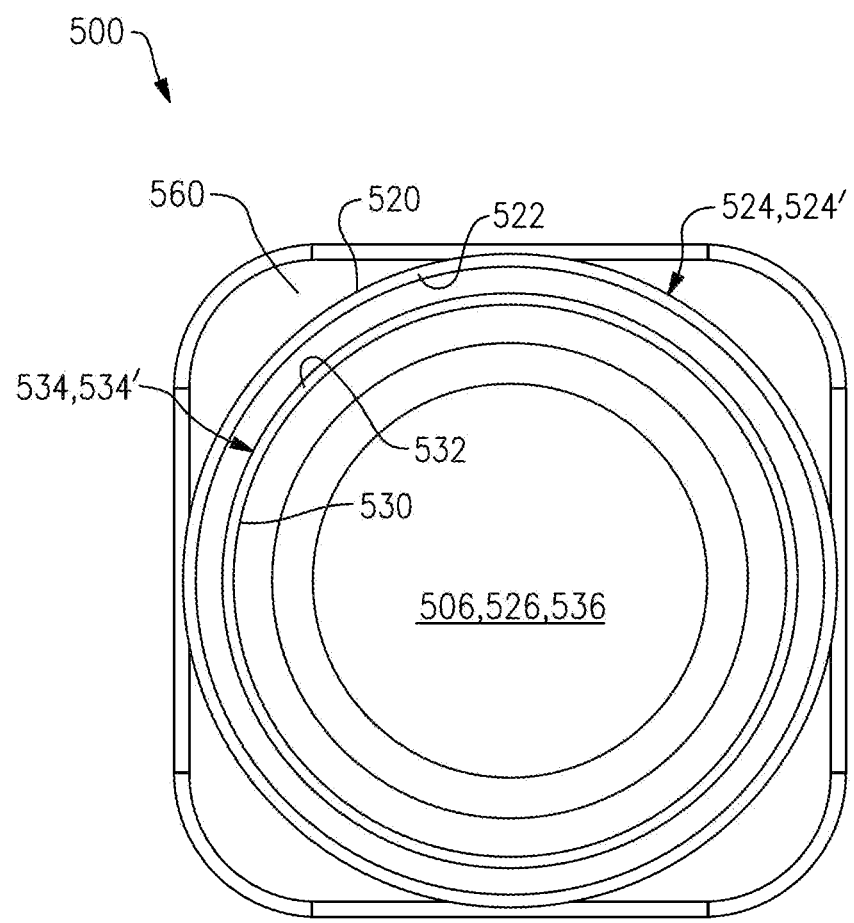

The exemplary sub-assembly 500 shown in FIGS. 5A-B is substantially similar to the exemplary sub-assembly 400 of FIGS. 4A-B. A difference between exemplary sub-assembly 500 and exemplary sub-assembly 400 is the positions or arrangement of the first and second sealing surfaces 566, 568 of the alpha-alumna collar 560, and thereby the active braze bonds 575 between the second portions 524, 534 of the outer and inner Ni rings 520, 530 and the alpha-alumna collar 460. In exemplary sub-assembly 400, the first and second portions 466, 468 of the alpha-alumna collar 460 are substantially aligned in the vertical direction (the direction of the first and second F1 and F2 tensile forces of the "peel test"), as shown in FIG. 4A. To achieve the arrangement, the second sealing surface or portion 468 of the alpha-alumna collar 460 (and thereby the inner Ni ring 430 and the active braze bond 475 therebetween) is set in a channel or groove that extends into the collar 460 in a medial portion of the collar 460. In contrast, as shown in FIGS. 5A-B the first and second portions 566, 568 of the alpha-alumna collar 560 are substantially offset or "stepped" in the vertical direction. In such an arrangement, the alpha-alumna collar 560 may be thinner in the lateral direction while still providing a relatively large or sufficient amount of collar 560 material on the interior side of the outer and inner Ni rings 520, 530. Thereby, the exemplary sub-assembly 500 may provide a particularly robust arrangement.

Figure 6A:
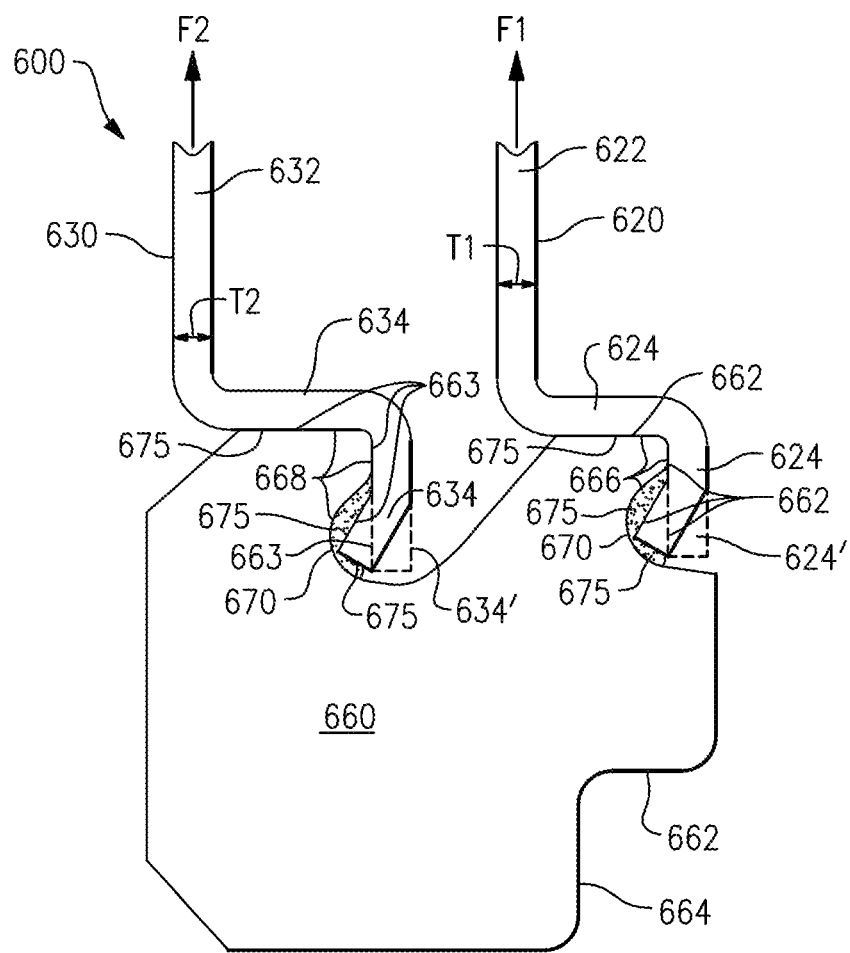
FIGS. 6A-6B are a cross-sectional view and a top view, respectively, of an exemplary fourth embodiment of an exemplary alpha-alumina collar sealed to exemplary Ni outer and inner rings by active brazing according to the present disclosure.
Figure 6B:
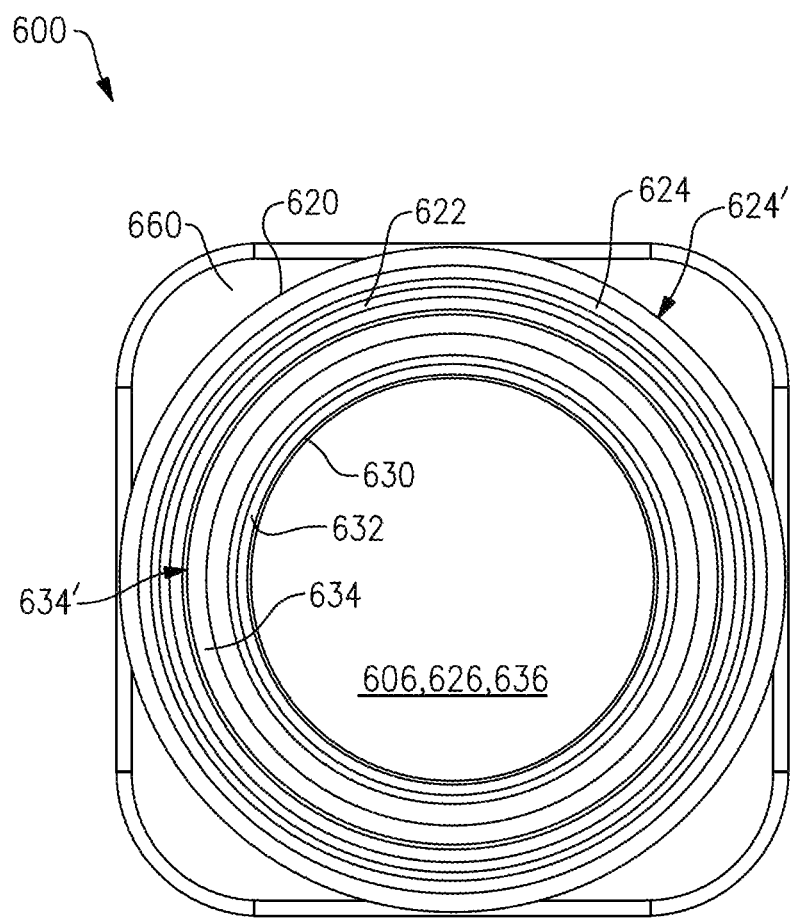

A fourth exemplary sub-assembly 600 embodiment including exemplary outer and inner Ni rings and an exemplary alpha-alumina collar bonded to one another by active brazing according to the present disclosure is shown in FIGS. 6A-B. The exemplary sub-assembly 600 is similar to the exemplary sub-assemblies 100, 300, 400 and 500 described above and therefore like reference numerals preceded by the numeral "6", as opposed to "1", "3", "4" or "5", are used to indicate like elements. The description above with respect to the other exemplary alpha-alumna collars and Ni rings, and subassemblies thereof, including description regarding alternative embodiments (i.e., modifications, variations or the like), equally applies to sub-assembly 600 (and any alternative embodiments thereof). As shown in FIGS. 6A-B, inter alia, the exemplary sub-assembly 600 differs from the other exemplary sub-assemblies of FIGS. 1-5B in the orientation or arrangement of the sealing surfaces or portions 662, 663 of the outer and inner Ni rings 620, 630 and the corresponding sealing surfaces or portions 666, 668 of the alpha-alumna collar 660 that are bonded or sealed therewith via active brazes 675.

As shown in FIGS. 6A-B, the exemplary second portions 624, 634 of the outer and inner Ni rings 620, 630 and the exemplary first and second sealing surfaces or portions 666, 668 of the alpha-alumna collar 660, and therefore the active braze bonds or seals 675 therebetween, of the exemplary sub-assembly 600 are L-shaped. Specifically, the exemplary alpha-alumna collar 460 includes horizontal sealing surfaces 666, 668 on an upper portion of the collar 660 that extend perpendicular to the first and second F1, F2 tensile forces of the "peel test", as shown in FIG. 6A. Adjacent the "horizontal" sealing surfaces 666, 668 on an upper portion of the collar 660 are "vertical" sealing surfaces 666, 668 extending in the direction of the first and second F1, F2 tensile forces into the medial portion of the collar 660. As the "vertical" sealing surfaces 666, 668 are outwardly facing, the "vertical" sealing surfaces 666, 668 include the inwardly extending recesses 670.

Correspondingly, the second portions 624, 634 of the outer and inner Ni rings 620, 630 are L-shaped and include "horizontal" sealing surfaces 662, 663 and "vertical" sealing surfaces 662, 663 for sealing with the "horizontal" sealing surfaces 666, 668 and "vertical" sealing surfaces 666, 668 of the collar 660, respectively, via active brazing 675. In this way, the active brazes 675, 675 between the "horizontal" sealing surfaces 662, 663 of the outer and inner Ni rings 620, 630 and the "horizontal" sealing surfaces 666, 668 of the alpha-alumina collar 660 would likely be primarily or substantially solely subject to tensile stress by the first and second tensile forces F1, F2 and similar forces during use in a battery. Similarly, the active brazes 675, 675 between the "vertical" sealing surfaces 662, 663 of the outer and inner Ni rings 620, 630 and the "vertical" sealing surfaces 666, 668 of the alpha-alumina collar 660 would likely be subject to shear stress by the first and second tensile forces F1, F2 and similar forces during use in a battery.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A sub-assembly for at least partially sealing a cell of a sodium-based thermal battery, the sub-assembly including:
   an outer metal ring defining a first aperture and including a first portion and a second portion, the second portion including a first inwardly facing sealing surface;
   an inner metal ring defining a second aperture that is smaller than the first aperture of the outer metal ring in at least one dimension and including a third portion and a fourth portion, the fourth portion including a second inwardly facing sealing surface; and
   a ceramic collar defining a third aperture and including a first outwardly facing sealing surface configured for mating with the first inwardly facing sealing surface of the outer metal ring and a second outwardly facing surface configured for mating with the second inwardly facing sealing surface of the inner metal ring, the first outwardly facing sealing surface including a first inwardly extending recess and the second outwardly facing sealing surface including a second inwardly extending recess,
   wherein at least a portion of the first inwardly facing sealing surface of the second portion of the outer metal ring is sealed to and deformed into the first inwardly extending recess of the first outwardly facing sealing surface of the ceramic collar by active brazing, and wherein at least a portion of the second inwardly facing sealing surface of the fourth portion of the inner metal ring is sealed to and deformed into the second inwardly extending recess of the second outwardly facing sealing surface of the ceramic collar by active brazing.

2. The sub-assembly of claim 1, wherein the inner and outer metal rings are substantially nickel, wherein the ceramic collar is substantially alpha-alumina, and wherein the second portion of the outer metal ring and the fourth portion of the inner metal ring is hermetically sealed to the ceramic collar.

3. The sub-assembly of claim 1, wherein the ceramic collar substantially electrically insulates the outer and inner metal rings from each other.

4. The sub-assembly of claim 1, wherein at least one of:
   the first inwardly facing sealing surface of the outer metal ring and a portion of the first outwardly facing sealing surface of the ceramic collar other than the first recess are substantially flat ring-shaped sealing surfaces; and
   the second inwardly facing sealing surface of the inner metal ring and a portion of the second outwardly facing sealing surface of the ceramic collar other than the second recess are substantially flat ring-shaped sealing surfaces.

5. The sub-assembly of claim 4, wherein under normal operating conditions of the sodium-based thermal battery at least one of:
   the size of the ring-shaped first inwardly facing sealing surface of the outer metal ring is smaller than the size of the ring-shaped first outwardly facing sealing surface of the ceramic collar in at least one dimension such that the outer metal ring and the ceramic collar are press fit after active brazing thereof; and
   the size of the ring-shaped second inwardly facing sealing surface of the inner metal ring is smaller than the size of the ring-shaped second outwardly facing sealing surface of the ceramic collar in at least one dimension such that the inner metal ring and the ceramic collar are press fit after active brazing thereof.

6. The sub-assembly of claim 1, wherein at least one of:
   the first inwardly facing sealing surface of the outer metal ring is oriented at an angle with respect to the first portion of the outer metal ring; and
   the second inwardly facing sealing surface of the inner metal ring is oriented at an angle with respect to the third portion of the inner metal ring.

7. The sub-assembly of claim 1, wherein at least one of:
the first inwardly facing sealing surface of the outer metal ring is oriented substantially parallel with respect to the first portion of the outer metal ring; and
the second inwardly facing sealing surface of the inner metal ring is oriented substantially parallel with respect to the third portion of the inner metal ring.

8. The sub-assembly of claim 1, wherein at least one of:
the first and second portions of the outer metal ring are integral, and the first inwardly facing sealing surface of the outer metal ring is substantially aligned with an inwardly facing surface of the first portion of the outer metal ring; and
the third and fourth portions of the inner metal ring are integral, and the second inwardly facing sealing surface of the inner metal ring is substantially aligned with an inwardly facing surface of the third portion of the inner metal ring.

9. A sodium-based thermal battery including an electrically conductive case and at least one cell with a cathode current collector assembly, the battery including:
an outer metal ring defining a first aperture and including a first portion and a second portion, the first portion being operably electrically coupled to the case, and the second portion including a first inwardly facing sealing surface;
an inner metal ring defining a second aperture that is smaller than the first aperture of the outer metal ring in at least one dimension and including a third portion and a fourth portion, the third portion being operably electrically coupled to the cathode current collector assembly, and the fourth portion including a second inwardly facing sealing surface; and
a ceramic collar defining a third aperture and including a first outwardly facing sealing surface configured for mating with the first inwardly facing sealing surface of the outer metal ring and a second outwardly facing surface configured for mating with the second inwardly facing sealing surface of the inner metal ring, the first outwardly facing sealing surface including a first inwardly extending recess and the second outwardly facing sealing surface including a second inwardly extending recess,
wherein at least a portion of the first inwardly facing sealing surface of the second portion of the outer metal ring is sealed to and deformed into the first inwardly extending recess of the first outwardly facing sealing surface of the ceramic collar by active brazing, and wherein at least a portion of the second inwardly facing sealing surface of the fourth portion of the inner metal ring is sealed to and deformed into the second inwardly extending recess of the second outwardly facing sealing surface of the ceramic collar by active brazing.

10. The battery of claim 9, wherein the inner and outer metal rings are substantially nickel, wherein the ceramic collar is substantially alpha-alumina, and wherein the second portion of the outer metal ring and the fourth portion of the inner metal ring is hermetically sealed to the ceramic collar.

11. The battery of claim 9, wherein ceramic collar substantially electrically insulates the outer and inner metal rings and thereby the case and the cathode current collector assembly.

12. The battery of claim 9, wherein at least one of:
the first inwardly facing sealing surface of the outer metal ring and a portion of the first outwardly facing sealing surface of the ceramic collar other than the first recess are substantially flat ring-shaped sealing surfaces; and
the second inwardly facing sealing surface of the inner metal ring and a portion of the second outwardly facing sealing surface of the ceramic collar other than the second recess are substantially flat ring-shaped sealing surfaces.

13. The battery of claim 12, wherein under normal operating conditions of the battery at least one of:
the size of the ring-shaped first inwardly facing sealing surface of the outer metal ring is smaller than the size of the ring-shaped first outwardly facing sealing surface of the ceramic collar in at least one dimension such that the outer metal ring and the ceramic collar are press fit after active brazing thereof; and
the size of the ring-shaped second inwardly facing sealing surface of the inner metal ring is smaller than the size of the ring-shaped second outwardly facing sealing surface of the ceramic collar in at least one dimension such that the inner metal ring and the ceramic collar are press fit after active brazing thereof.

14. The battery of claim 9, wherein at least one of:
the first inwardly facing sealing surface of the outer metal ring is oriented at an angle with respect to the first portion of the outer metal ring; and
the second inwardly facing sealing surface of the inner metal ring is oriented at an angle with respect to the third portion of the inner metal ring.

15. The battery of claim 9, wherein at least one of:
the first inwardly facing sealing surface of the outer metal ring is oriented substantially parallel with respect to the first portion of the outer metal ring; and
the second inwardly facing sealing surface of the inner metal ring is oriented substantially parallel with respect to the third portion of the inner metal ring.

16. The battery of claim 15, wherein at least one of:
the first and second portions of the outer metal ring are integral and the first inwardly facing sealing surface of the outer metal ring is substantially aligned with an inwardly facing surface of the first portion of the outer metal ring; and
the third and fourth portions of the inner metal ring are integral and the second inwardly facing sealing surface of the inner metal ring is substantially aligned with an inwardly facing surface of the third portion of the inner metal ring.

17. A method of at least partially sealing a cell of a sodium-based rechargeable thermal battery including a case and a cathode current collector assembly, the method including:
obtaining an outer metal ring defining a first aperture and including a first portion and a second portion, the second portion including a first inwardly facing sealing surface;
obtaining an inner metal ring defining a second aperture that is smaller than the first aperture of the outer metal ring in at least one dimension and including a third portion and a fourth portion, the fourth portion including a second inwardly facing sealing surface;
obtaining an electrically insulating ceramic collar defining a third aperture and including a first outwardly facing sealing surface configured for mating with the first inwardly facing sealing surface of the outer metal ring and a second outwardly facing surface configured for mating with the second inwardly facing sealing surface of the inner metal ring, the first outwardly facing sealing surface including a first inwardly extending recess and the second outwardly facing sealing surface including a second inwardly extending recess;
active brazing at least a portion of the first inwardly facing sealing surface of the second portion of the outer metal ring to the first outwardly facing sealing surface of the ceramic collar and thereby deforming a portion of the second portion of the outer metal ring into the first inwardly extending recess of the first outwardly facing sealing surface of the ceramic collar;

active brazing at least a portion of the second inwardly facing sealing surface of the second portion of the inner metal ring to the second outwardly facing sealing surface of the ceramic collar and thereby deforming a portion of the fourth portion of the inner metal ring into the second inwardly extending recess of the second outwardly facing sealing surface of the ceramic collar;

operably electrically coupling the outer metal ring to the case; and operably electrically coupling the inner metal ring to the cathode current collector assembly.

18. The method of claim 17, wherein the inner and outer metal rings are substantially nickel, wherein the ceramic collar is substantially alpha-alumina, and wherein the second portion of the outer metal ring and the fourth portion of the inner metal ring is hermetically sealed to the ceramic collar by the active brazing.

19. The method of claim 17, wherein at least one of:

the first inwardly facing sealing surface of the outer metal ring and a portion of the first outwardly facing sealing surface of the ceramic collar other than the first recess are substantially flat ring-shaped sealing surfaces; and the second inwardly facing sealing surface of the inner metal ring and a portion of the second outwardly facing sealing surface of the ceramic collar other than the second recess are substantially flat ring-shaped sealing surfaces.

20. The method of claim 17, wherein under normal operating conditions of the battery at least one of:

the size of the first inwardly facing sealing surface of the outer metal ring is smaller than the size of the first outwardly facing sealing surface of the ceramic collar in at least one dimension such that the outer metal ring and the ceramic collar are press fit after the active brazing thereof; and the size of the second inwardly facing sealing surface of the inner metal ring is smaller than the size of the second outwardly facing sealing surface of the ceramic collar in at least one dimension such that the inner metal ring and the ceramic collar are press fit after the active brazing thereof.

21. The method of claim 17, wherein at least one of:

the first inwardly facing sealing surface of the outer metal ring is oriented at an angle with respect to the first portion of the outer metal ring;

the second inwardly facing sealing surface of the inner metal ring is oriented at an angle with respect to the third portion of the inner metal ring;

the first and second portions of the outer metal ring are integral, and the first inwardly facing sealing surface of the outer metal ring is substantially aligned with an inwardly facing surface of the first portion of the outer metal ring; and the third and fourth portions of the inner metal ring are integral, and the second inwardly facing sealing surface of the inner metal ring is substantially aligned with an inwardly facing surface of the third portion of the inner metal ring.

\* \* \* \* \*